(12) United States Patent
Shirakawa et al.

(10) Patent No.: US 9,091,758 B2
(45) Date of Patent: Jul. 28, 2015

(54) DETECTION AND RANGING SYSTEM AND ANGLE ESTIMATION METHOD

(71) Applicants: FUJITSU LIMITED, Kawasaki-shi, Kanagawa (JP); Fujitsu Ten Limited, Kobe-shi, Hyogo (JP)

(72) Inventors: Kazuo Shirakawa, Yokohama (JP); Yasuhiro Kurono, Kobe (JP)

(73) Assignees: FUJITSU LIMITED, Kawasaki (JP); FUJITSU TEN LIMITED, Kobe-shi (JP)

( * ) Notice: Subject to any disclaimer, the term of this patent is extended or adjusted under 35 U.S.C. 154(b) by 290 days.

(21) Appl. No.: 13/680,279

(22) Filed: Nov. 19, 2012

(65) Prior Publication Data

US 2013/0147656 A1 Jun. 13, 2013

(30) Foreign Application Priority Data

Dec. 8, 2011 (JP) ................................. 2011-268868

(51) Int. Cl.
*G01S 13/06* (2006.01)
*G01S 13/42* (2006.01)
(Continued)

(52) U.S. Cl.
CPC ................. *G01S 13/42* (2013.01); *G01S 13/89* (2013.01); *G01S 13/931* (2013.01); *G01S 2013/9375* (2013.01)

(58) Field of Classification Search
CPC .......... G01S 13/42; G01S 13/931; G01S 3/74
USPC ............................. 342/70, 133, 146, 147, 175
See application file for complete search history.

(56) References Cited

U.S. PATENT DOCUMENTS 7,859,450 B2 12/2010 Shirakawa et al.
7,912,680 B2 3/2011 Shirakawa
(Continued)

FOREIGN PATENT DOCUMENTS

JP 10-253731 9/1998
JP 2000-121716 4/2000
(Continued)

OTHER PUBLICATIONS

Jung-Tae Kim; Dong-Seong Han, "Fast DOA estimation algorithm using pseudo covariance matrix," Vehicular Technology Conference, 2003. VTC 2003-Spring. The 57th IEEE Semiannual , vol. 1, no., pp. 519,523 vol. 1, Apr. 22-25, 2003.*
(Continued)

*Primary Examiner* — John B Sotomayor
*Assistant Examiner* — Marcus Windrich
(74) *Attorney, Agent, or Firm* — Katten Muchin Rosenman LLP

(57) ABSTRACT

A detection and ranging system includes: M transmitting sensor elements configured to transmit a probe signal; N receiving sensor elements configured to receive an echo signal generated upon reflection of the probe signal from a target; a matrix generator configured to generate a third matrix by multiplying a first matrix by a second matrix, the first matrix including as diagonal components L received signals obtained from an effective receiving sensor array formed by synthesizing the M transmitting sensor elements and the N receiving sensor elements, the second matrix being formed of P L-dimensional vectors that are linearly independent of each other; and an estimator configured to estimate a direction of arrival of the echo signal from the target according to a pseudo covariance matrix generated by multiplying the third matrix by Hermitian conjugate transposition of the third matrix.

5 Claims, 8 Drawing Sheets

(51) Int. Cl.
*G01S 13/89* (2006.01)
*G01S 13/93* (2006.01)

(56) References Cited

U.S. PATENT DOCUMENTS

| | | | |
|---|---|---|---|
| 8,009,083 | B2 | 8/2011 | Shirakawa |
| 2008/0316090 | A1* | 12/2008 | Shirakawa .................. 342/195 |
| 2009/0079617 | A1 | 3/2009 | Shirakawa et al. |
| 2009/0224978 | A1* | 9/2009 | Shirakawa .................. 342/386 |
| 2009/0243933 | A1* | 10/2009 | Shirakawa .................. 342/417 |
| 2010/0156701 | A1 | 6/2010 | Shirakawa |
| 2011/0095940 | A1* | 4/2011 | Breed .......................... 342/146 |
| 2013/0147656 | A1* | 6/2013 | Shirakawa et al. .......... 342/146 |

FOREIGN PATENT DOCUMENTS

| | | |
|---|---|---|
| JP | 2001-108734 | 4/2001 |
| JP | 2002-243825 | 8/2002 |
| JP | 2003-222665 | 8/2003 |
| JP | 2009-80024 | 4/2009 |
| JP | 2009-243947 | 10/2009 |
| JP | 2010-145289 | 7/2010 |

OTHER PUBLICATIONS

Extended European Search Report dated May 23, 2014, from the corresponding EP Application No. 12194182.7.

Zhong Wen et al: "Fast Direction Finding Using Modified Pseudocovariance Matrix", IEEE Transactions on Antennas and Propagation, IEEE Service Center, Piscataway, NJ, US, vol. 54, No. 12, Dec. 1, 2006, pp. 3914-3918, XP011151468, ISSN: 0018-926X, DOI:10.1109/TAP.2006.886572 * the whole document *.

Hichem Semira et al: "High Resolution Direction Finding Using Krylov Subspace", 4th International Conference: Sciences of Electronic, Technologies of Information and Telecommunications, Mar. 29, 2007, pp. 1-6, XP055117660, * the whole document *.

Wang L et al: "Constrained adaptive filtering algorithms based on conjugate gradient techniques for beamforming", IET Signal Processing, vol. 4, No. 6, Dec. 16, 2010, pp. 686-697, XP006036068, ISSN: 1751-9683, DOI: 10.1049/IET-SPR:20090243 * sec. 4.3 *.

Rohan Grover et al: "Subspace Direction Finding With an Auxiliary-Vector Basis", IEEE Transactions on Signal Processing, IEEE Service Center, New York, NY, US, vol. 55, No. 2, Jan. 1, 2007, pp. 758-763, XP011156113, ISSN: 1053-587X, D0I: 10.1109/TSP.2006.885771 *sec. II-IV *.

M Joham et al: "Interpretation of the Multi-Stage Nested Wiener Filter in the Krylov Subspace Framework", Jan. 1, 2000, pp. 1-18, XP055099286, Retrieved from the Internet: URL:https://engineering.purdue.edu/˜mikedz/research/msnwf_tutorial.pdf [retrieved on Jan. 29, 2014] * sec. 5 and B *.

San0 A et al: "Computationally Efficient Subspace-Based Method for Direction-of-Arrival Estimation Without Eigendecomposition", IEEE Transactions on Signal Processing, IEEE Service Center, New York, NY, US, vol. 52, No. 4, Apr. 1, 2004 pp. 876-893, XP011109158, ISSN: 1053-587X, D0I: 10.1109/TSP.2004.823469 *the whole document *.

Hichem Semira et al: "High-Resolution Source Localization Algorithm Based on the Conjugate Gradient", EURASIP Journal on Advances in Signal Processing, vol. 2007, No. 1, Jan. 1, 2007, p. 073871, XP055117662, ISSN: 1687-6180, D0I:10.1109/TAP2003.814744 *sec. 3 *.

Huang Lei et al.: "A low-complexity method of signal subspace fitting", Acta Electronica Sinica, vol. 33, No. 6, Jun. 1, 2005 XP55117668, * sec. 3.2.2 *.

Office Action dated Jun. 2, 2015, from corresponding Japanese Patent Application No. 2011-268868 with translation of the relevant part, p. 3, lines 23-35 of the Office Action.

* cited by examiner

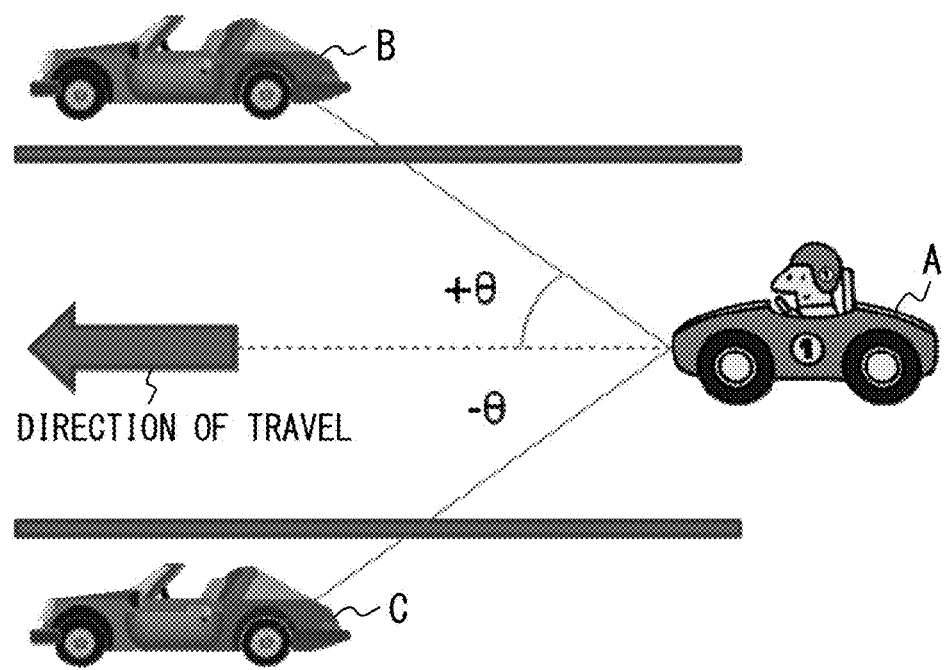
F I G. 2

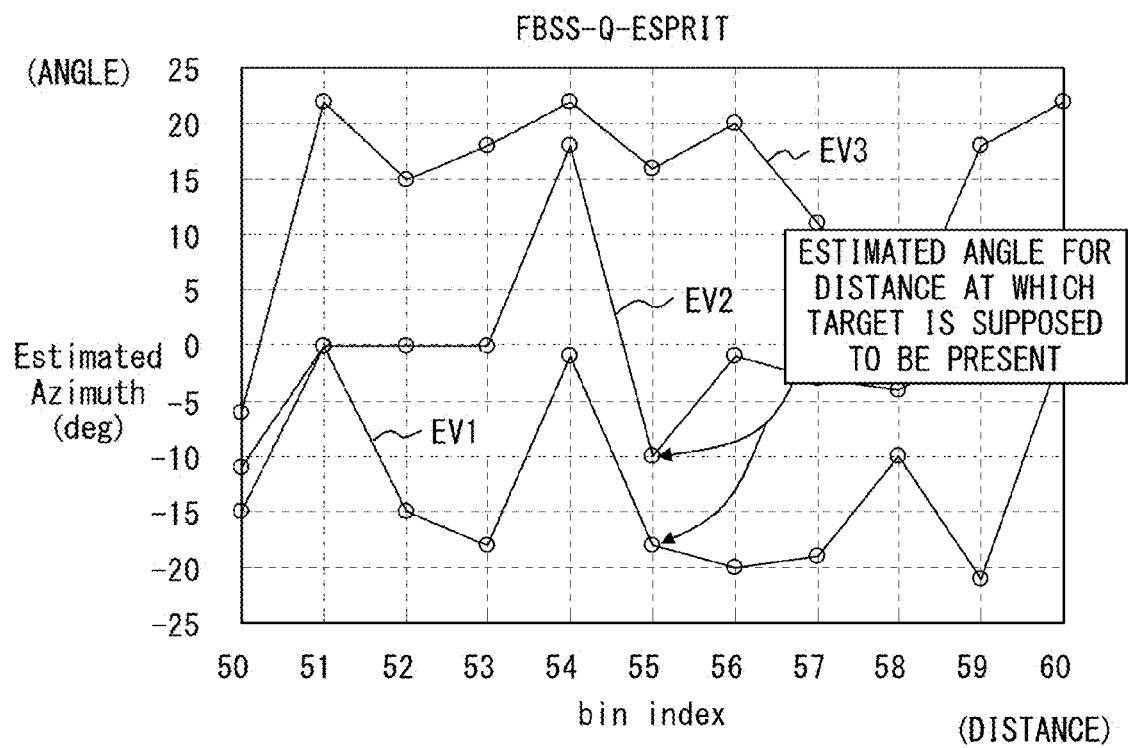
F I G. 3

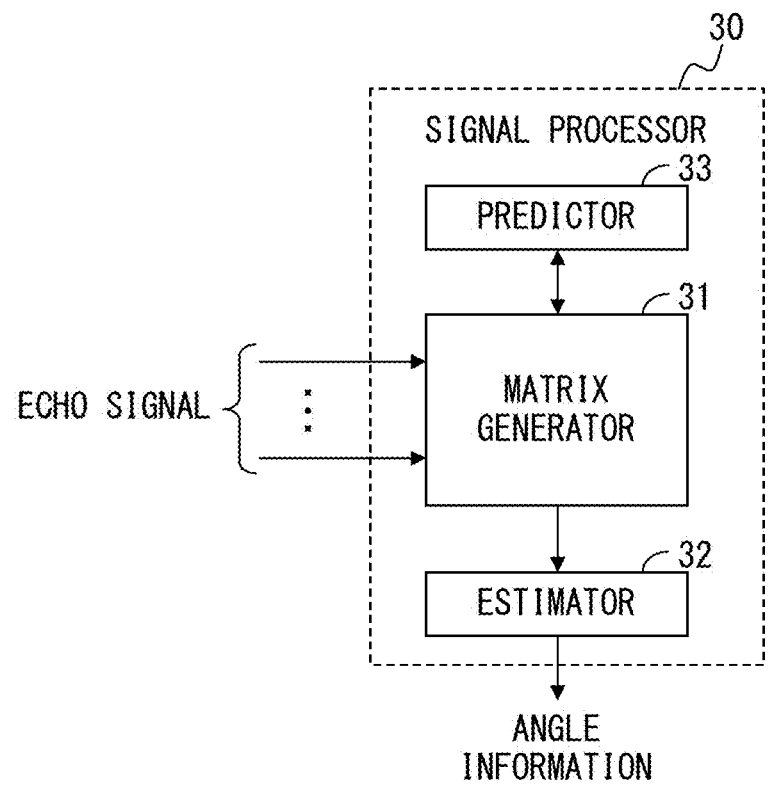
F I G. 4

DETECTION AND RANGING SYSTEM AND ANGLE ESTIMATION METHOD

CROSS-REFERENCE TO RELATED APPLICATION

This application is based upon and claims the benefit of priority of the prior Japanese Patent Application No. 2011-268868, filed on Dec. 8, 2011, the entire contents of which are incorporated herein by reference.

FIELD

The embodiments described herein are related to a system for detection and ranging of a target object and a method for angle estimation.

BACKGROUND

Conventionally, detection and ranging systems that detect a target using radio waves (e.g., millimeter waves) have been put into practical use. The detection and ranging systems radiate a probe signal to a detection region and receive a reflected signal (i.e., an echo signal) from a target. By analyzing the received echo signal, the detection and ranging systems estimate a line-of-sight direction relative distance to the target (hereinafter simply referred to as "distance"), a line-of-sight direction relative speed of the target (hereinafter simply referred to as "speed"), and the direction to (or angle formed with) the target. Such detection and ranging systems include, for example, a plurality of receiving sensor elements arranged at equal spacing and detect a target according to, for example, the phase of an echo signal received by each receiving sensor element. That is, for a target within a detection region, factors (such as distance, speed, and angle) are estimated. As an example, Japanese Laid-open Patent Publication No. 2010-145289 is known as one related art.

Some detection and ranging systems that detect a target using a transmitting sensor array having M sensor elements and a receiving sensor array having N sensor elements generate a signal vector based on an echo signal from the target and perform signal processing on the signal vector so as to estimate the direction of arrival of the echo signal (i.e., the angle formed with the target). Such systems and, in particular, detection and ranging systems including radars use a technology called "spatial smoothing" in order to eliminate coherency of received signals.

The echo signal from each target includes angle information of the target. An angle matrix describes, as phase information, the position of a sensor element that receives the signal.

However, in a case in which a plurality of angle vectors that form the angle matrix include angle vectors that are complex-conjugate to each other (this case may more generally be represented as a case in which a certain angle vector is complex-conjugate to a vector represented by a linear combination of other angle vectors; this case will hereinafter be described as an implication), the rank of a covariance matrix of a received-signal vector used to estimate the direction of arrival of an echo signal (i.e., the angle formed with the target) is degraded. In this case, a calculation for estimating a direction of arrival according to an inverse matrix or eigenvalue decomposition of the covariance matrix does not hold true, and targets are not detected accurately in some situations.

The degradation of the rank of a covariance matrix may occur due to the position of a target regardless of coherency of received signals. Accordingly, using the spatial smoothing method for eliminating coherency of received signals does not improve the accuracy of estimation of a direction of arrival (this direction is actually an angle formed with a target, and they will not be distinguished from each other in the following descriptions).

As described above, in the prior art, the rank of a covariance matrix of a received-signal vector has been degraded due to, for example, the position of a target, and, even when the target is located within a detection region, the target is not accurately detected in some situations. Accordingly, reliability or practicability of detection and ranging systems has needed to be enhanced.

SUMMARY

According to an aspect of the embodiments, a detection and ranging system includes: M transmitting sensor elements configured to transmit a probe signal; N receiving sensor elements configured to receive an echo signal generated upon reflection of the probe signal from a target; a matrix generator configured to generate a third matrix by multiplying a first matrix by a second matrix, the first matrix including as diagonal components L received signals obtained from an effective receiving sensor array formed by synthesizing the M transmitting sensor elements and the N receiving sensor elements, the second matrix being formed of P L-dimensional vectors that are linearly independent of each other; and an estimator configured to estimate a direction of arrival of the echo signal from the target according to a pseudo covariance matrix generated by multiplying the third matrix by Hermitian conjugate transposition of the third matrix.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a position relationship between a detection and ranging system and targets.

FIG. 3 illustrates results of angle estimation in the case illustrated in FIG. 2 for which a method in accordance with an embodiment is not used.

FIG. 4 illustrates functions of a signal processor.

DESCRIPTION OF EMBODIMENTS

A detection and ranging system in accordance with an embodiment of the present invention includes M transmitting sensor elements and N receiving sensor elements. Note that M is an integer that is one or greater and N is an integer that is two or greater. Each of the transmitting sensor elements radiates a probe signal to a detection region. When there is a target (or an object to be detected) within the target region, the probe signal is reflected from the target. Each of the receiving sensor elements receives a reflected signal (i.e., an echo signal) from the target. By analyzing, for example, the phase of the received echo signal, the detection and ranging system estimates the distance from the detection and ranging system to the target, the speed of the target relative to the detection and ranging system, and the direction to (or the angle formed with) the target.

Assume that, in the following embodiments, the detection and ranging system is a radar. In this case, transmitting sensor elements are transmitting antennas (TX antennas), and receiving sensor elements are receiving antennas (RX antennas).

Figure 1:
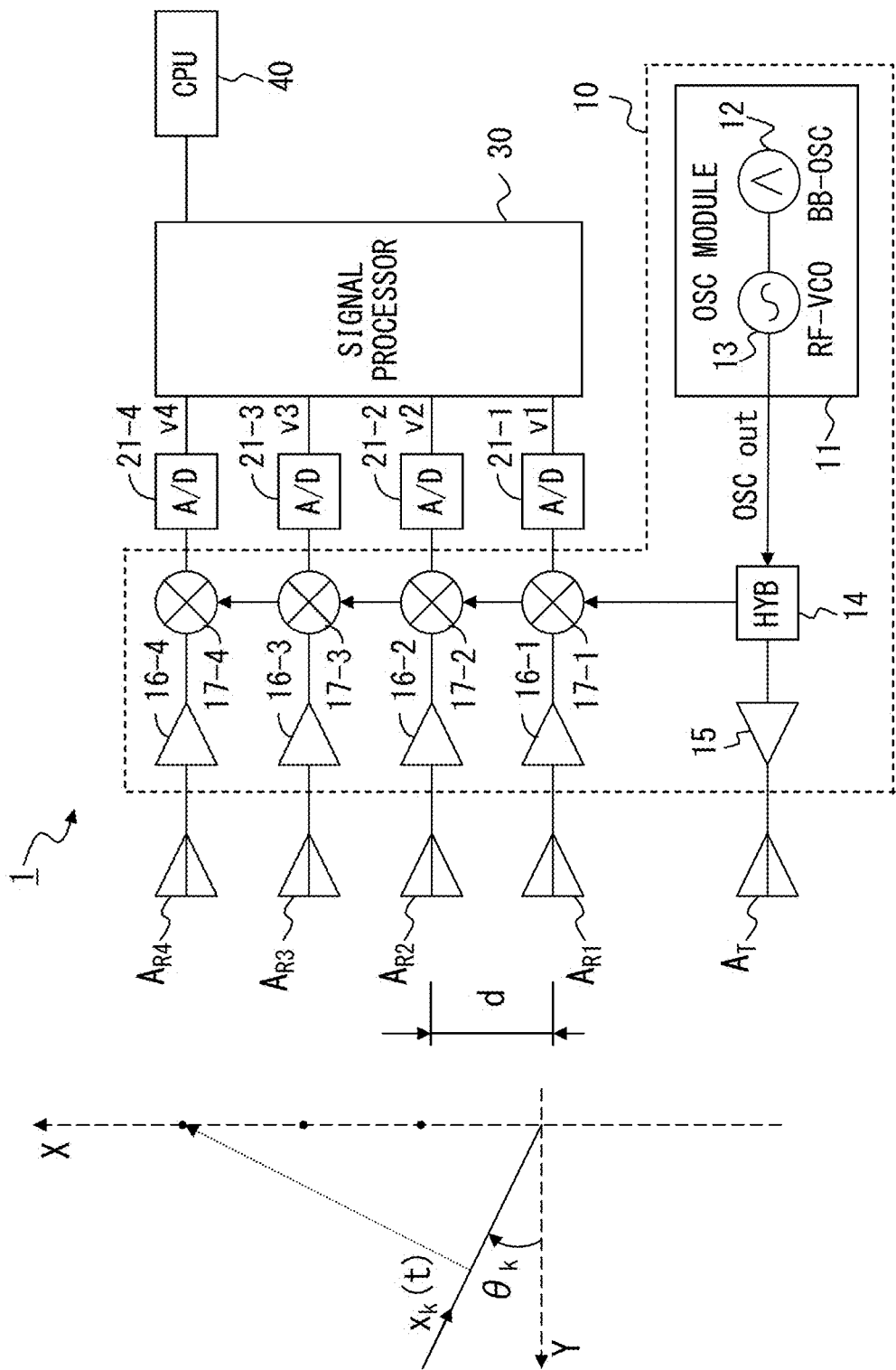
FIG. 1 illustrates a configuration of a detection and ranging system in accordance with an embodiment.

FIG. 1 illustrates an exemplary configuration of a detection and ranging system (hereinafter referred to as a "detection and ranging system 1") in accordance with an embodiment. The detection and ranging system 1 includes a transceiver circuit 10, a transmitting antenna $A_T$ (i.e., M=1), receiving antennas $A_{R1}$ to $A_{R4}$ (i.e., N=4), A/D converters 21-1 to 21-4, a signal processor 30, and a CPU 40. In the following, to simplify the explanation, it should be assumed that the signal processor 30 performs a detection and ranging process and that the CPU 40 controls operations of the detection and ranging system 1, and operations of the CPU 40 will not be described.

The transceiver circuit 10 includes a signal generator (OSC module) 11 that generates a probe signal. The signal generator 11 includes a modulation input signal generator (BB-OSC: base band oscillator) 12 and a high frequency voltage-controlled oscillator (RF-VCO: radio frequency voltage-controlled oscillator) 13 that oscillates at a specified center frequency (a carrier frequency).

The BB-OSC 12 generates a modulation input signal. In this embodiment, the modulation input signal is a periodic voltage signal. A modulation input signal that is, for example, a triangular wave includes, for each period Tm, an up-chirp section in which a voltage increases linearly with respect to time and a down-chirp section in which a voltage decreases linearly with respect to time. The period Tm is determined in accordance with, for example, distance resolution or speed resolution, and the period Tm is, for example, about several tens of milliseconds. The modulation input signal is not limited to the aforementioned waveform but can be another waveform.

The RF-VCO 13 has a control signal input terminal to which a control signal that controls an oscillatory frequency is input. The RF-VCO 13 oscillates at a frequency corresponding to a voltage (or a current) applied to the control signal input terminal. The terms "frequency" and "angular frequency" are not distinguished from each other in this description, and both of these words are referred to as "frequency". That is, "frequency" includes an angular frequency.

A control signal obtained by superimposing the aforementioned modulation input signal on a reference voltage for setting a carrier frequency to $\omega_C$ is applied to the control signal input terminal of the RF-VCO 13. Accordingly, an instantaneous frequency of the RF-VCO 13 is centered around the carrier frequency $\omega_C$ and changes in accordance with the modulation input signal. In this way, a probe signal (OSC-out) is generated. The carrier frequency $\omega_C$ corresponding to the reference voltage is not particularly limited but may be, for example, 76 GHz.

A probe signal generated by the signal generator 11 is amplified by a power amplifier (PWA) 15 and is then radiated from the transmitting antenna $A_T$ toward a detection region.

The probe signal is also guided to mixers (MIXs) 17-1 to 17-4 by a divider (HYB) 14. The mixers 17-1 to 17-4 will be described hereinafter.

Each of the receiving antennas $A_{R1}$ to $A_{R4}$ receives an echo signal generated from a probe signal being reflected by a target. For simplicity, assume that, in this embodiment, the transmitting antenna $A_T$ and the receiving antennas $A_{R1}$ to $A_{R4}$ are arranged on a straight line. Also for simplicity, assume that the transmitting antenna $A_T$ is located on an extension of the straight line on which the receiving antennas $A_{R1}$ to $A_{R4}$ are arranged. Moreover, assume that the receiving antennas $A_{R1}$ to $A_{R4}$ are arranged at equally-spaced interval d.

Echo signals, which are received by the receiving antennas $A_{R1}$ to $A_{R4}$, are respectively amplified by low noise amplifiers (LNAs) 16-1 to 16-4, and the echo signals are then guided to the mixers 17-1 to 17-4. The mixers 17-1 to 17-4 respectively mix the probe signal with echo signals received by the corresponding receiving antennas $A_{R1}$ to $A_{R4}$. As a result, the echo signals are down-converted and demodulated, and baseband signal components (hereinafter simply referred to as "baseband components) are obtained.

A/D converters 21-1 to 21-4 respectively convert the baseband components of echo signals received by the receiving antennas $A_{R1}$ to $A_{R4}$ into digital data signals $v_1$ to $V_4$. The digital data signals $v_1$ to $v_4$ are input to the signal processor 30. The digital data signals $v_1$ to $v_4$ are sometimes referred as "data signal(s)" or "baseband echo signal(s)" or simply as "received signal(s)".

The signal processor 30 includes a processor and/or a hardware circuit for digital computation. In accordance with M×N sets of digitalized data signals, the signal processor 30 estimates a distance from the detection and ranging system 1 to each target, the speed of each target, and the angle formed with each target. In this embodiment, M=1 and N=4, and the signal processor 30 detects each target according to four sets of data signals $v_1$ to $v_4$.

Using at least one data signal, the signal processor 30 estimates the distance from the detection and ranging system 1 to a target and the speed of the target. In this case, the signal processor 30 applies, for example, PET to respective data signals in a time domain obtained for the up-chirp section and the down-chirp section of the modulation input signal so as to convert the data signal into a data signal in a frequency domain.

In accordance with a peak frequency obtained in the up-chirp section and a peak frequency obtained in the down-chirp section, the signal processor 30 estimates the distance from the detection and ranging system 1 to the target and the speed of the target. Methods for detecting a target from a peak frequency (i.e., a frequency that indicates a spectrum value exceeding a specified threshold when the power spectrum of a data signal in a frequency domain is plotted with respect to frequency) may be implemented using known arts, and hence these methods are not described herein.

The signal processor 30 can estimate the angle formed with the target by applying a known direction-of-arrival estimating method to a plurality of data signals. As described above, in some cases, the direction of arrival of an echo signal and the angle formed with a target are not distinguished.

As examples of the method for estimating the direction of arrival of an echo signal, DBF (digital beam forming), MUSIC (multiple signal classification), PRISM (propagator method based on an improved spatial-smoothing matrix), ESPRIT (estimation of signal parameters via rotational invariance techniques), and the like are known. The detection and ranging system 1 may be configured to be capable of performing two or more direction-of-arrival estimating algorithms.

Operations of the detection and ranging system 1 having the aforementioned configuration will be described. Assume that there are K targets within the detection range of the detection and ranging system 1. Accordingly, a probe signal radiated from the transmitting antenna $A_T$ is reflected from each target, and an RF echo signal corresponding to each target is generated. The receiving antennas $A_{R1}$ to $A_{R4}$ receive RF echo signals from the directions of targets k (k=1 to K) (i.e., angle $\theta_k$).

In this description, as illustrated in FIG. 1, the position of the receiving antenna $A_{R1}$ is the origin of X-Y coordinates. The transmitting antenna $A_T$ and the receiving antennas $A_{R1}$ to $A_{R4}$ are positioned on the X axis. The receiving antennas $A_{R1}$ to $A_{R4}$ are sequentially arranged at equally-spaced interval d in the positive direction of the X axis. In addition, the positive direction of the Y axis is defined as 0 degree, and a clockwise direction is defined as a positive direction of angle. Accordingly, if the position of $A_{R1}$ is at the origin, an equiphase surface of a signal is obtained in the negative direction of the Y axis, but the equiphase surface is depicted without considering visual inconsistency so that the equiphase surface can be readily seen.

In this case, an RF echo signal received by an n-th receiving antenna is guided to the mixer 17-n. In the mixer 17-n, this RF echo signal is multiplied by the probe signal to perform down converting and demodulating. As a result, a baseband signal $V_n(t)$ that includes factor information of each target is generated. In view of the context, as long as there is no possibility of misunderstanding, $V_n(t)$ may hereinafter simply be referred to as an "echo signal".

The echo signal $V_n(t)$ obtained via the n-th receiving antenna is expressed by formula (1.1). Note that $x_k(t)$ is a in baseband component corresponding to an echo signal from a k-th target (this component may also be referred to as an "echo signal"). Formula (1.2) is a spatial phase that is assigned to $X_k(t)$ in accordance with a spatial arrangement of the receiving antennas $A_{R1}$ to $A_{R4}$ under a condition in which the antenna $A_{R1}$ is a phase reference of angular vectors. $n_n(t)$ represents a noise signal. In the following, vectors and matrixes may be expressed without using a bold face.

$$v_n(t) = \sum_{k=1}^{K} x_k(t)\exp(-j\phi_{n,k}) + n_n(t) \quad (1.1)$$

$$\phi_{n,k} \equiv -\frac{2\pi}{\lambda}(n-1)d\sin\theta_k \quad (1.2)$$

As indicated above, an echo signal obtained by each receiving antenna includes signal components reflected from K targets. A spatial phase (hereinafter simply referred to as "phase" if there is no possibility of misunderstanding)$\phi_{n,k}$ of an echo signal reflected from target k is different for each receiving antenna.

The detection and ranging system 1 has N (in this example, N=4) receiving antennas. Accordingly, expressing the aforementioned echo signal in a vector form obtains formula (1.3). A superscript T represents transposition. (n, k) component of an angular matrix A represents a phase of an echo signal from the k-th target contained in a signal received by the n-th antenna.

$$v(t) = \begin{bmatrix} \sum_{k=1}^{K} x_k(t)\exp(-j\phi_{1,k}) + n_1(t) \\ \vdots \\ \sum_{k=1}^{K} x_k(t)\exp(-j\phi_{N,k}) + n_N(t) \end{bmatrix} = Ax(t) + n(t) \quad (1.3)$$

$$A \equiv [a(\theta_1), \ldots, a(\theta_K)] = \begin{bmatrix} \exp(-j\phi_{1,1}) & \ldots & \exp(-j\phi_{1,K}) \\ \vdots & \ddots & \vdots \\ \exp(-j\phi_{N,1}) & \ldots & \exp(-j\phi_{N,K}) \end{bmatrix} \quad (1.4)$$

$$x(t) \equiv [x_1(t) \ldots x_K(t)]^T \quad (1.5)$$

$$n(t) \equiv [n_1(t) \ldots n_N(t)]^T \quad (1.6)$$

In order to simplify the description, assume that there is no correlation between a baseband signal vector x(t) and a noise signal vector n(t). Accordingly, for a received signal vector v(t) expressed by formula (1.3), a covariance matrix $R_{vv}$ expressed by formula (1.7) is obtained. The covariance matrix $R_{vv}$ is used as a computing target by the detection and ranging system 1 when the angle formed with a target estimated using an array antenna.

$$R_{vv} \equiv E\{v(t)v^H(t)\} = AR_{xx}A^H + \sigma^2 I \quad (1.7)$$

$\sigma^2$ corresponds to power of a noise signal. Matrix I represents a unit matrix. Matrix $R_{xx}$ is a covariance matrix of a baseband signal and is defined by formula (1.8). A superscript H represents Hermitian conjugate transposition. In the following, for ease of description, time t is not expressed.

$$R_{xx} \equiv E[x(t)x^H(t)] \quad (1.8)$$

As indicated above, the signal processor 30 of the detection and ranging system 1 generates the covariance matrix $R_{vv}$ expressed by formula (1.7) from an echo signal received by a plurality of receiving antennas. Using the covariance matrix $R_{vv}$, the signal processor 30 can obtain angle information of a target. As an example, in a Capon method, the angle formed with a target is estimated using an angle spectrum $P_{Capon}(\theta)$ expressed by formula (1.9).

$$P_{Capon}(\theta) = \frac{a^H(\theta)a(\theta)}{a^H(\theta)R_{vv}^{-1}a(\theta)} \quad (1.9)$$

$R_{vv}^{-1}$ vv is an inverse matrix of the covariance matrix $R_{vv}$. $a(\theta)$ is an angle vector that changes in accordance with a parameter $\theta$ and is defined by formula (1.10).

$$a(\theta) \equiv \{1\exp[-j\alpha\sin(\theta)], \ldots, \exp[-j\alpha(N-1)\sin(\theta)]\},$$
$$\alpha = 2\pi d/\lambda \quad (1.10)$$

The signal processor 30 calculates the value of $P_{Capon}$ while scanning the parameter $\theta$ in formula (1.9). The value of $\theta$ that is indicated when $P_{Capon}$ becomes a peak value is decided to be the angle formed with a target (i.e., the direction of arrival of an echo signal).

However, since RF echo signals received by the detection and ranging system 1 are reflected waves of the probe signal radiated from the same signal source, these signals practically coherent each other. This is a property based on coherency of baseband echo signals, and, as a result, a relationship between the rank of the covariance matrix $R_{vv}$ and the matrix $R_{xx}$, and the number of targets K is as expressed by formula (1.11). The rank of a matrix corresponds to the maximum number of linearly independent column vectors (or row vectors) that form the matrix.

$$\text{rank}(R_{vv}) = \text{rank}(R_{xx}) < K \quad (1.11)$$

As indicated above, since the covariance matrix $R_{vv}$ does not have an inverse matrix when the rank of the covariance matrix $R_{vv}$ is less than the number of targets, it is impossible to estimate the angles formed with the targets using an inverse matrix or an eigenvalue of the covariance matrix. In this case, for example, since an inverse matrix $R_{vv}^{-1}$ used in the Capon method indicated by formula (1.9) does not exist, the signal processor 30 can not accurately calculate $P_{Capon}$, thus it is difficult to estimate the angle formed with the target.

This problem relating particularly to the detection and ranging system may be solved by, for example, recovering the rank of the covariance matrix $R_{VV}$ and by equivalently eliminating coherency of baseband echo signals. Spatial smoothing is known as a method for recovering the rank of a matrix. Examples of known spatial smoothing include forward spatial smoothing (FSS), backward spatial smoothing (BSS), and forward backward spatial smoothing (FBSS).

In forward spatial smoothing, a plurality of Q×Q partial matrixes are extracted along a principal diagonal of the covariance matrix $R_{VV}$. When the dimension of the covariance matrix $R_{VV}$ is L×L, the number of partial matrixes that can be extracted is L−Q+1. The plurality of extracted partial matrixes are summed and the average of these matrixes is calculated, thereby generating a covariance matrix to which spatial smoothing has been applied (referred to as a "spatial smoothing matrix). However, to accurately recover the rank by spatial smoothing, Q that satisfies "Q≥K+1" needs to be determined in advance (This means that the number of targets, i.e., the number of baseband echoes, needs to be estimated in advance, but, since there is nothing to do with a feature of the invention, descriptions will not given of such procedures; the descriptions using a method other than a method adopted in the calculation examples described hereinafter are based on the assumption that K is accurately estimated).

In backward spatial smoothing, a spatial smoothing matrix is generated using a procedure similar to the procedure in forward spatial smoothing. In backward spatial smoothing, however, a reference point of a sensor array is inverted when a spatial smoothing process is performed. Forward backward spatial smoothing is a technique that is a combination of forward spatial smoothing and backward spatial smoothing.

Properly applying the aforementioned spatial smoothing recovers the rank of the covariance matrix $R_{VV}$. Accordingly, an angle is estimated by substituting an inverse matrix of a spatial smoothing matrix obtained by forward backward spatial smoothing in formula (1.9). Alternatively, an angle may be estimated by applying an operation such as eigenvalue decomposition to a spatial smoothing matrix obtained by forward backward spatial smoothing.

However, when there are targets at specific positions within a detection region, the rank of an angle matrix formed of an angle vector may be degraded irrespective of a problem of coherency of baseband echo signals. That is, when one or more combinations of any of K angle vectors $a(\theta_1)$, $a(\theta_2) \ldots , a(\theta_K)$ expressed by formula (1.4) are complex-conjugate to each other due to the positions of the targets (see the general case in the "BACKGROUND" section), the rank of a covariance matrix is degraded. In this case, since the reason for degradation of a rank is different from coherency, the rank of the covariance matrix $R_{vv}$ is not recovered by applying the aforementioned spatial smoothing. That is, it is difficult to estimate an angle formed with each target.

Descriptions will be given of an exemplary case in which the rank of a matrix is degraded due to the positions of targets. In this example, the detection and ranging system has one transmitting antenna (i.e., M=1) and four receiving antennas (i.e., N=4). There are two targets (i.e., K=2) within a detection range.

The detection and ranging system (radar) is installed in a vehicle A in FIG. 2 and detects a space ahead of the vehicle A. That is, the positive direction of the Y axis for the detection and ranging system in FIG. 1 is substantially identical with the direction of travel of the vehicle A in FIG. 2. In this example, the vehicle A is traveling on the center lane of a three-lane road. Vehicles B and C are targets to be detected by the detection and ranging system. The vehicle B is traveling ahead of the vehicle A and on the right lane, and the vehicle C is traveling ahead of the vehicle A and on the left lane. The distance from the vehicle A to the vehicle B is approximately equal to the distance from the vehicle A to the vehicle C. The speed of the vehicle B relative to the vehicle A is approximately equal to the speed of the vehicle C relative to the vehicle A. In addition, if the direction of traveling of the vehicle A is the Y-axis direction (i.e., a 0-degree direction) of the detection and ranging system, the position of the vehicle B is oriented in the direction of +θ and the position of the vehicle C is oriented in the direction of −θ.

In this case, echo signals received by the receiving antennas $A_{R1}$ to $A_{R4}$ of the detection and ranging system are expressed by the following formulae, (1.12) to (1.15). Formulae (1.12) to (1.15) correspond to formulae (1.3) to (1.6), respectively.

$$v = Ax + n \quad (1.12)$$

$$A = [\, a_1 \;\; a_2 \,] = \begin{bmatrix} 1 & 1 \\ \exp(-j\phi) & \exp(j\phi) \\ \exp(-j2\phi) & \exp(j2\phi) \\ \exp(-j3\phi) & \exp(j3\phi) \end{bmatrix}, \quad (1.13)$$

$$\pm\phi = \frac{2\pi d}{\lambda}\sin(\pm\theta)$$

$$x = [\, x_1 \;\; x_2 \,]^T \quad (1.14)$$

$$n = [\, n_1 \;\; \ldots \;\; n_4 \,]^T \quad (1.15)$$

The covariance matrix $R_{vv}$ of the received signal vector v can be expanded as indicated by formula (1.16) using a matrix $a_m a_n^H$ (m=1, 2; n=1, 2) generated from an angle vector $a_1$ corresponding to an echo signal from the vehicle B and an angle vector $a_2$ corresponding to an echo signal from the vehicle C. To simplify the descriptions, a noise component is not considered in formula (1.16).

$$R_{vv} = vv^H; \quad (1.16)$$

$$AR_{xx}A^H = (x_1 a_1 + x_2 a_2)(x_1^* a_1^H + x_2^* a_2^H)$$

$$= \sum_{m=1}^{2}\sum_{n=1}^{2} x_m x_n^* a_m a_n^H = |x_1|^2 a_1 a_1^H + x_1 x_2^* a_1 a_2^H +$$

$$x_2 x_1^* a_2 a_1^H + |x_2|^2 a_2 a_2^H$$

However, in the case illustrated in FIG. 2, for the angle vector $a_1$ and the angle vector $a_2$, $a_2=a_1^*$ and $a_2^H=a_1^T$ are satisfied. Accordingly, the covariance matrix $R_{vv}$ may be expressed by formula (1.17).

$$R_{vv}=|x_1|^2 a_1 a_1^H + x_1 x_2^* a_1 a_1^T + x_2 x_1^* a_1 a_1^H + |x_2|^2 a_1^* a_1^T, \cdot \cdot a_2 = a_1^* a_2^H = a_1^T \quad (1.17)$$

That is, the covariance matrix $R_{vv}$ can be expressed by only one of the angle vector $a_1$ and the angle vector $a_2$. Formula (1.17) uses only the angle vector $a_1$, and every vector that forms the matrix $a_m a_n^H$ formed by angle vectors can be expressed as a scalar multiple of $a_1$. In other words, as an example, every column vector of each matrix generated as a tensor product of an angle vector corresponding to an echo signal from the vehicle B and an angle vector corresponding to an echo signal from the vehicle C will belong to a subspace covered by $a_1$. Accordingly, the rank of the covariance matrix $R_{vv}$ becomes less than the number of targets (that is, K).

In the case above, K=2 and the rank of the covariance matrix $R_{vv}$ is 1. As a result, for the two targets (vehicles B and C) in FIG. 2, it is difficult to estimate the angles using an inverse matrix or an eigenvalue of the covariance matrix $R_{vv}$. In addition, as described above, when the rank of a covariance matrix is degraded due to the position of targets, it is impossible to recover the rank using the aforementioned spatial smoothing.

FIG. 3 illustrates the result of angle estimation for the vehicles B and C in the case illustrated in FIG. 2. In this example, the distance from the vehicle A to the vehicle B is 40 m, the distance from the vehicle A to the vehicle C is 40 m, the speed of the vehicle B relative to the vehicle A is 0 km/h, the speed of the vehicle C relative to the vehicle A is 0 km/h, the angle formed by the vehicle B relative to the vehicle A is +3 degrees, and the angle formed by the vehicle C relative to the vehicle A is −3 degrees. The horizontal axis in FIG. 3 represents the distance from the vehicle A to a target (a bin index of FFT). In the graph in FIG. 3, the position on the horizontal axis indicating the value 55 approximately corresponds to 40 m in the actual distance. The vertical axis represents an angle estimated according to an echo signal (or the direction of arrival of the echo signal). On the assumption that the number of targets is always three, the detection and ranging system applies some additional operations (in the case of, for example, ESPRIT, a known art, these additional operations include, for example, extracting of a partial matrix from $R_{vv}$ and generating of a nonsingular matrix using the extracted partial matrix, but different operations are applied in accordance with what angle estimating technique is used) to the covariance matrix $R_{vv}$, calculates eigenvalues of the resultant matrix, and estimates an angle formed with a target from the eigenvalues (that is, in the case of FIG. 2, one of the calculated three angles is a meaningless value, so the angle estimating technique employed by the detection and ranging system is provided with function for identifying the meaningless value; however, details of this function are not described since they have nothing to do with the invention).

In this example, three eigenvalues (EV1 to EV3) are calculated from the covariance matrix $R_{vv}$. The detection and ranging system can detect that a target is present at a position which is approximately 40 m distant (according to, for example, an FFT peak). In the situation of FIG. 2, however, since the rank of $R_{vv}$ is degraded to 1, the number of targets is decided to be 1, with the result that it is impossible to identify which of the angles corresponding to the three eigenvalues is a target factor. Moreover, even if eigenvalue decomposition is applied to a matrix with a degraded rank to forcibly calculate the angle, the value is inappropriate. Actually, the aforementioned function for identifying a meaningless eigenvalue suggests that EV1 and EV2 may respectively correspond to the vehicles B and C; however, the angles formed by the vehicles B and C each at a position which is about 40 m distant arc "about −10 degrees" and "about −18 degrees". That is, these angles are completely different from the values in the aforementioned scene setting, ±3 degrees.

As described above, when targets are located at the positions illustrated in FIG. 2, it is impossible to accurately estimate an angle formed with the target from the covariance matrix $R_{vv}$. Accordingly, the detection and ranging system 1 in accordance with the embodiment uses an algorithm to solve such a problem.

<Algorithm that Recovers Rank>

In the following descriptions, it is also assumed that the detection and ranging system 1 has one transmitting antenna (i.e., M=1) and four receiving antennas (i.e., N=4) as illustrated in FIG. 1. In addition, assume that there are two targets (i.e., K=2) within a detection range as illustrated in, for example, FIG. 2.

First, a phase offset matrix B indicated by formula (2.1) will be considered.

$$B = \begin{bmatrix} e^{j\delta} & & & \\ & e^{j2\delta} & & \\ & & e^{j3\delta} & \\ & & & e^{j4\delta} \end{bmatrix} \quad (2.1)$$

The phase offset matrix B is an L×L-dimensional square matrix. A method to increase the effective number of receiving antennas by combining transmitting/receiving antennas is known technique, and L is, for example, M×N; in this example, L=4. Parameter δ is determined in accordance with a detection range of a target. An exemplary method for determining δ will be described hereinafter. The values of components on a diagonal of the phase offset matrix B are different from each other. In this example, the values of the components on the diagonal of the phase offset matrix B are exp(jδ), exp(j2δ), exp(j3δ), and exp(j4δ). Components of the phase offset matrix B other than the diagonal components are 0.

Next, an extended received-signal vector w is generated from a baseband echo signal (received signal) vector v converted into digital data and the phase offset matrix B. Note that the extended received-signal vector w is actually a matrix. However, since the extended received-signal vector w corresponds to the received signal vector v indicated by formula (1.3) or (1.12), the extended received-signal vector w is referred to as a "vector" for convenience.

As indicated by formula (2.2), the extended received-signal vector w is obtained from the echo signal vector v and a matrix that is the (p−1)-th power of the phase offset matrix B (p=1 to P; P is an integer that is smaller than L). That is, the extended received-signal vector w is generated according to a Krylov subspace. In this example, a first sequence of the extended received-signal vector w is obtained by multiplying the received signal vector v by the 0-th power of the phase offset matrix B (i.e., an L-dimensional unit matrix I). A second sequence of the extended received-signal vector w is obtained by multiplying the phase offset matrix B by the received signal vector v. Finally, a third sequence of the extended received-signal vector w is obtained by multiplying the received signal vector v by the square of the phase offset matrix B.

$$w=[B^0 v \; Bv \; B^2 v]=[Iv \; Bv \; B^2 v]=[v \; Bv \; B^2 v] \quad (2.2)$$

In addition, formula (2.3) is obtained by expanding and rearranging formula (2.2). Definitions of new matrixes V and G are also given at formula (2.3).

$$w = \begin{bmatrix} v_1 & v_1 e^{j\delta} & v_1 e^{j2\delta} \\ v_2 & v_2 e^{j2\delta} & v_2 e^{j4\delta} \\ v_3 & v_3 e^{j3\delta} & v_3 e^{j6\delta} \\ v_4 & v_4 e^{j4\delta} & v_4 e^{j8\delta} \end{bmatrix} = \begin{bmatrix} v_1 & & \\ & v_2 & \\ & & v_3 \\ & & & v_4 \end{bmatrix} \begin{bmatrix} 1 & e^{j\delta} & e^{j2\delta} \\ 1 & e^{j2\delta} & e^{j4\delta} \\ 1 & e^{j3\delta} & e^{j6\delta} \\ 1 & e^{j4\delta} & e^{j8\delta} \end{bmatrix} \equiv VG \quad (2.3)$$

As indicated by formula (2.3), the extended received-signal vector w can be expressed as the product of the matrix V and the matrix G. The matrix V is a square matrix that includes the received signals $V_1$ to $V_4$ respectively received by the receiving antennas $A_{R1}$ to $A_{R4}$ as diagonal components. The other components of the matrix V are 0. The matrix G is composed of P four-dimensional vectors $g_1$ to $g_P$ that are linearly independent of each other. As described above, in an algorithm used in this example, P=3 since operations including eigenvalue decomposition and angle estimating are performed with the rank of the covariance matrix $R_{vv}$ being fixed at "N−1 (or L−1)". That is, the matrix G is in the form of four row and three-column and has three four-dimensional vectors $g_1$ to $g_3$.

At the first to third columns of the matrix G, a vector $g_1=[1\ 1\ 1\ 1]^T$, a vector $g_2=[\exp(j\delta)\ \exp(j2\delta)\ \exp(j3\delta)\ \exp(j4\delta)]^T$, and a vector $g_3=[\exp(j2\delta)\ \exp(j4\delta)\ \exp(j6\delta)\ \exp(j8\delta)]^T$ are respectively provided. The three vectors $g_1$ to $g_3$ that form the matrix G are linearly independent of each other ($\delta \neq 0$).

In the detection and ranging system 1, the extended received-signal vector w is processed in the similar manner to the received signal vector v indicated by formula (1.3) or (1.12). Accordingly, a matrix $R_{ww}$ corresponding to the covariance matrix $R_{vv}$ can be expressed by formula (2.4). $R_{ww}$ will be referred to as a pseudo covariance matrix.

$$R_{ww} \equiv ww^H = VG(VG)^H = V(GG^H)V_H \quad (2.4)$$

In this example, rank($R_{ww}$)=min{rank(V) and rank(G)}=rank(G)=3. That is, the rank of the pseudo covariance matrix $R_{ww}$ is 3. In this way, even when the position relationship between the detection and ranging system 1 and the targets are as indicated in FIG. 2, the rank of the pseudo covariance matrix $R_{ww}$ recovers to a desired value.

Using the pseudo covariance matrix $R_{ww}$, the detection and ranging system 1 estimates the angle formed with each target. That is, as an example, when the detection and ranging system 1 calculates the angle spectrum $P_{Capon}(\theta)$, the pseudo covariance matrix $R_{ww}$ is fed to the formula (1.9) instead of the covariance matrix $R_{vv}$. The detection and ranging system 1 calculates $P_{Capon}$ while scanning the parameter $\theta$, and the detection and ranging system 1 determines that the value of $\theta$ that is indicated when $P_{Capon}$ becomes a peak value is the angle formed with the target (i.e., the direction of arrival of the echo signal). Alternatively, the detection and ranging system 1 may apply eigenvalue decomposition to a matrix obtained as a result of application of some additional operations to the pseudo covariance matrix $R_{ww}$ and may estimate the angle formed with the target (i.e., the direction of arrival of the echo signal) from the eigenvalue.

FIG. 4 illustrates functions of the signal processor 30 of the detection and ranging system 1. Digital data that represents a baseband echo signal is input to the signal processor 30. In the configuration illustrated in FIG. 1, four RF echo signals respectively received by the receiving antennas $A_{R1}$ to $A_{R4}$ are down-converted, demodulated, and then converted into digital data, and this digital data is input to the signal processor 30.

The signal processor 30 includes a matrix generator 31, an estimator 32, and a predictor 33. However, the signal processor 30 may be configured to not include the predictor 33. Accordingly, the matrix generator 31 and the estimator 32 are described here, and the predictor 33 will be described later.

The matrix generator 31 multiplies a first matrix by a second matrix to generate a third matrix. The first matrix includes as diagonal components L received signals (these signals correspond to the digital data representing a baseband echo signal in the case of the system illustrated in FIG. 1) $v_1$ to $v_L$ obtained from an effective sensor array formed by combining M transmitting sensor elements and N receiving sensor elements. The second matrix is formed of P L-dimensional vectors $g_1$ to $g_P$ that are linearly independent of each other. The matrix generator 31 has a function for calculating the covariance matrix $R_{vv}$ from the received signal vector v; however, this function will not be described here. In the configuration illustrated in FIG. 1, M=1, N=4, and L=4. An example of the first matrix is the matrix V in formula (2.3), and an example of the second matrix is the matrix G in formula (2.3). In this case, the third matrix corresponds to the matrix VG in formula (2.3). Note that P=3 in formulae (2.1) to (2.3).

However, the matrix generator 31 does not need to generate the first and second matrixes individually in order to generate the third matrix. That is, the matrix generator 31 may generate the third matrix without respectively generating the first and second matrixes.

The estimator 32 estimates the direction of arrival of an echo signal from a target according to a covariance matrix of the third matrix. An example of the covariance matrix of the third matrix is the pseudo covariance matrix $R_{ww}$ in formula (2.4). Techniques used by the estimator 32 to estimate the direction of arrival of an echo signal are not particularly limited, but the technique is, for example, a method that relies on an eigenvalue of the pseudo covariance matrix $R_{ww}$.

Figure 5:
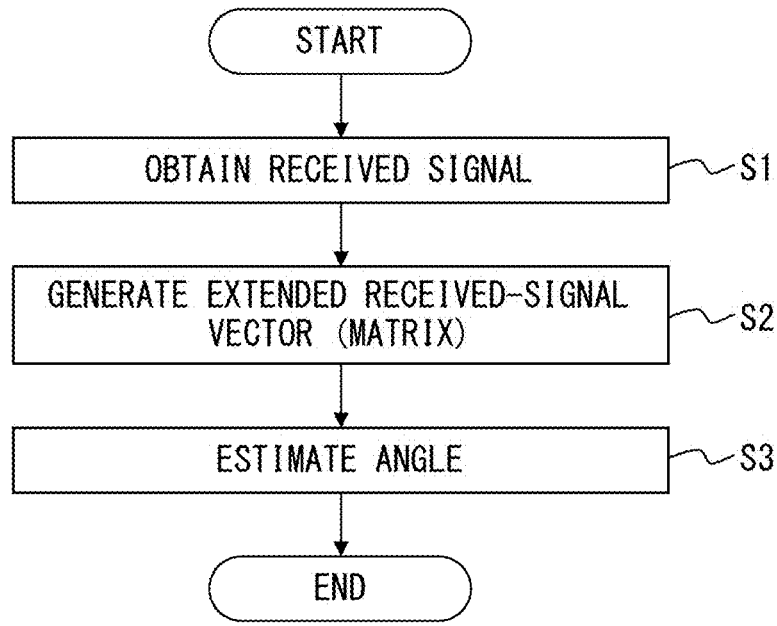
FIG. 5 is a flowchart illustrating an angle estimation method in accordance with an embodiment.

FIG. 5 is a flowchart illustrating an angle estimation method in accordance with the embodiment. This angle estimation method is performed by a signal processor 30 of a detection and ranging system which includes: M transmitting sensor elements that transmit a probe signal; and N receiving sensor elements that receive an echo signal generated upon reflection of the probe signal from a target. As an example, the processes in the flowchart are periodically performed repeatedly.

In S1, the signal processor 30 obtains L received signals $v_1$ to $v_L$ from an effective receiving sensor array formed by synthesizing M transmitting sensor elements and N receiving sensor elements. In S2, the signal processor 30 generates a third matrix that is obtained by multiplying a first matrix, which includes received signals $v_1$ to $v_L$ as diagonal components, by a second matrix, which is formed of P I-dimensional vectors $g_1$ to $g_P$ that are linearly independent of each other. In S3, the signal processor 30 estimates the direction of arrival of an echo signal from a target (or the angle formed with the target) according to a (pseudo) covariance matrix of the third matrix.

Figure 6:
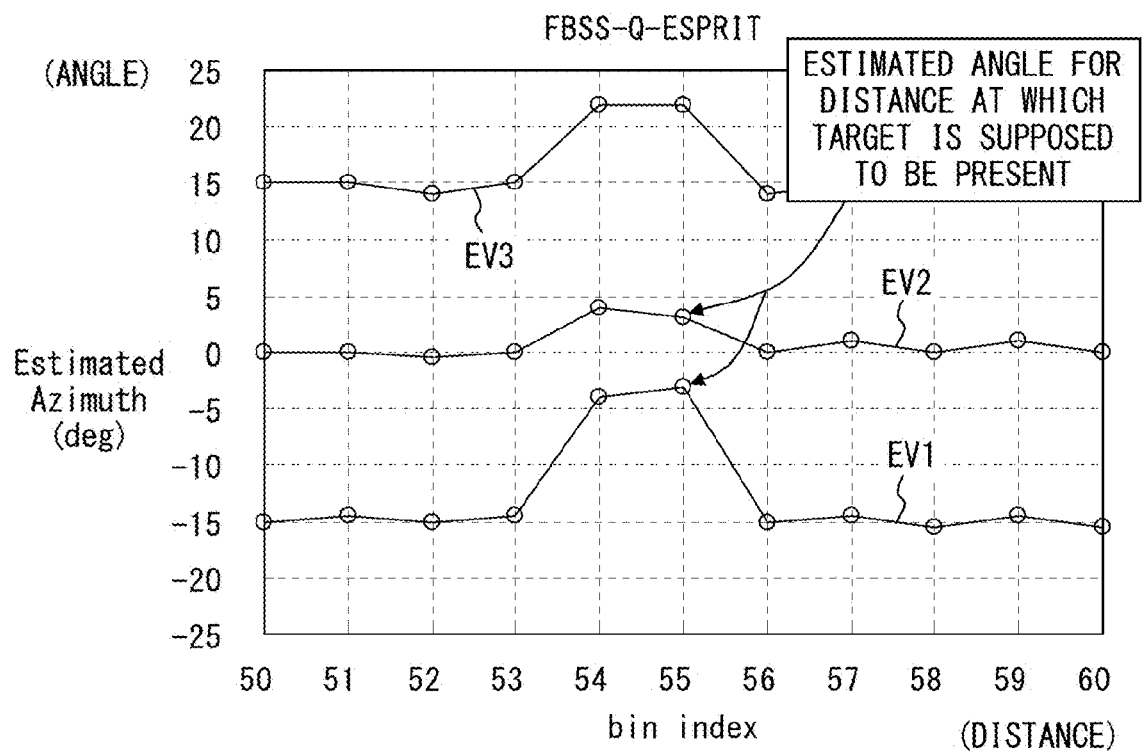
FIG. 6 illustrates results of angle estimation in the case illustrated in FIG. 2 for which a method in accordance with an embodiment is used.

FIG. 6 illustrates results of angle estimation indicated in the case illustrated in FIG. 2 for which a method in accordance with the embodiment is used. As with the estimation illustrated in FIG. 3, the estimation illustrated in FIG. 6 are based on the assumption that the distance from the vehicle A to the vehicle B is 40 m, the distance from the vehicle A to the vehicle C is 40 m, the speed of the vehicle B relative to the vehicle A is 0 km/h, the speed of the vehicle C relative to the vehicle A is 0 km/h, the angle formed by the vehicle B relative to the vehicle A is +3 degrees, and the angle formed by the vehicle C relative to the vehicle A is −3 degrees. However, in the estimation illustrated in FIG. 6, the pseudo covariance matrix $R_{ww}$ is used instead of the covariance matrix $R_{vv}$ (i.e., the algorithm for angle estimation is substantially the same between the estimations illustrated in FIG. 3 and FIG. 6, but is applied to a different object).

In FIG. 6, three eigenvalues (EV1 to EV3) are calculated from the pseudo covariance matrix $R_{ww}$, and two of these eigenvalues correspond to vehicles B and C. By using the aforementioned function for identifying a meaningless eigenvalue, it is decided that EV1 and EV2 correspond to actual vehicles. Thus, the detection and ranging system 1 estimates that there are two targets, one of which is located at a position that is approximately 40 m distant and that is oriented in an "about +3 degree" direction, and the other of which is located at a position that is approximately 40 m distant and that is oriented in an "about −3 degree" direction.

As described above, even when targets are in a special condition as illustrated in FIG. 2, the detection and ranging system 1 with a configuration and a method in accordance with the embodiment can precisely estimate the angle formed with each target (or the direction of arrival of an echo signal from each target). Accordingly, configurations and methods in accordance with the embodiment enhance reliability and practicability of angle estimation in the detecting of a target.

A case in which the rank of the covariance matrix $R_{vv}$ is degraded due to the position of a target is not limited to the example illustrated in FIG. 2. That is, a condition that is similar to the case illustrated in FIG. 2 may arise not only at three-lane roads but also in, for example, a situation in which there are guardrails along a traffic lane. Even when the detection and ranging system is not installed in a vehicle, depending on the position relationship between the detection and ranging system and a target, it may become difficult to estimate the angle due to degrading of the rank of the covariance matrix $R_{vv}$. Accordingly solving the aforementioned problems using configurations and methods in accordance with the embodiment also achieves a great advantage in practicability.

A parameter δ, which defines the phase offset matrix B expressed by formula (2.1), and a parameter P, which is used to generate the extended received-signal vector w expressed by formula (2.2), are not particularly limited but may be calculated by, for example, the following formula, (2.5).

$$e(\delta, p) = \min_{\substack{\delta \in F.O.V \\ p=1 \sim L-1}} \sum_{k=1}^{K} |\theta_k - \theta_k[w(\delta, p)]|^2 \quad (2.5)$$

To determine the parameter δ and the parameter P by applying this method to an actual system, K targets that form a specified angle $\theta_k$ are first provided within the field of view (FOV) of the detection and ranging system 1. Next, the algorithm of the embodiment is applied to certain values δ and P to estimate the angle $\theta_k[w(\delta, P)]$. Then, using the specified value $\theta_k$ and an estimate $\theta_k[w(\delta, P)]$, a least square evaluation function associated with the parameters δ and P (formula (2.5)) is defined. After this, while scanning δ and P within the scope of a spatial phase included in the FOV and within the scope of natural numbers 1 to L−1, the values of δ and P with a minimum evaluation function e (δ, P) are determined. This procedure is applied to various target angles within the FOV of the detection and ranging system 1 in order to determine the final values of δ and P.

Referring to, for example, formula (1.16), an angle combination that degrades the rank of a covariance matrix with respect to target angles is logically foreseeable, thus, the aforementioned technique may be applied to only this combination. When the FOV is wide, the angular range may be divided into a plurality of regions, and a different δ may be used for each of these regions. This is also true for P in accordance with K.

Another Embodiment

According to an angle estimation algorithm using ESPRIT (estimation of signal parameters via rotational invariance techniques) such as Q-ESRIT, some additional operations are applied to the covariance matrix $R_{vv}$ expressed by formula (1.7), and an angle is estimated from an eigenvalue obtained by applying eigenvalue decomposition to a matrix that is obtained as a result of the additional operations. Meanwhile, in the aforementioned embodiments, the extended received-signal vector w is configured using the received signal vector v and the phase offset matrix B, the pseudo covariance matrix $R_{ww}$ is generated from w, and the angle is estimated according to $R_{ww}$. Accordingly, eigenvalues obtained from the pseudo covariance matrix $R_{ww}$ deviate from a proper eigenvalue due to the influence of $GG^H$ indicated in formula (2.4). Such a deviation of an eigenvalue causes an error in angle estimation.

Accordingly, in order to suppress the influence of $GG^H$ indicated in formula (2.4), the detection and ranging system 1 calculates $R_{ww}$−yI (I is a unit matrix) by subtracting a specified value y from each diagonal component of the pseudo covariance matrix $R_{ww}$. $R_{ww}$−yI is referred to as a corrected matrix, which will again be referred to as $R_{ww}$. As an example, $(1/L)*\text{trace}(GG^H)$ is used as y. Note that "trace (A)" is the sum of diagonal components of the matrix A. Using the corrected matrix $R_{ww}$, the detection and ranging system 1 can enhance accuracy of angle estimation.

Still Another Embodiment

The signal processor 30 in accordance with the embodiment estimates an angle using the pseudo covariance matrix $R_{ww}$ that is generated according to a phase offset matrix. However, the detection and ranging system 1 may use the pseudo covariance matrix $R_{ww}$ only when the matrix is needed. That is, the detection and ranging system 1 may predict whether or not it is possible to estimate the direction of arrival of an echo signal according to the covariance matrix $R_{vv}$, and, when it is impossible to estimate the direction of arrival, the detection and ranging system 1 may estimate the angle using the pseudo covariance matrix $R_{ww}$.

In this case, the signal processor 30 of the detection and ranging system 1 includes the predictor 33 illustrated in FIG. 4. The predictor 33 estimates whether the direction of arrival of an echo signal can be estimated according to the covariance matrix $R_{vv}$ (calculated by the matrix generator 31) generated from the received signal vector v. It is assumed that a spatial smoothing process is applied to the generated $R_{vv}$ a required number of times. The predictor 33 uses, for example, a determinant of $R_{vv}$ as an index for predicting whether or not a direction of arrival can be estimated based on $R_{vv}$. This is a method that relies on the fact that, when the rank of $R_{vv}$ is degraded, the value of a determinant of $R_{vv}$ becomes approximately 0.

Alternatively, to predict degradation of the rank of $R_{vv}$ with the predictor 33, a known technique that uses triangular factorization (e.g., the method described in Japanese Laid-open Patent Publication No. 2009-210410) may be applied to $R_{vv}$, the number of targets may be predicted, and this predicted number may be used as the index. In this idea, as with the next predicting method, degradation of a rank is determined in accordance with sequential continuity of an index value so as to predict whether or not it is possible to estimate a direction of arrival. For example, when the number of targets suddenly decreases from two to one, it is determined that it is impossible to estimate a direction of arrival.

In addition, the predictor 33 may predict whether or not it is possible to estimate a direction of arrival according to temporal continuity of an angle estimate. As an example, the detection and ranging system 1 periodically estimates angles according to the covariance matrix $R_{vv}$ generated from the received signal vector v. When angles are estimated at short time intervals, a change between two consecutive estimated angles is very small. Accordingly, when the change in an angle that is estimated for one or more targets during the time interval above is greater than a specified threshold, the predictor 33 may predict that it is impossible to predict a direction of arrival.

Figure 7:
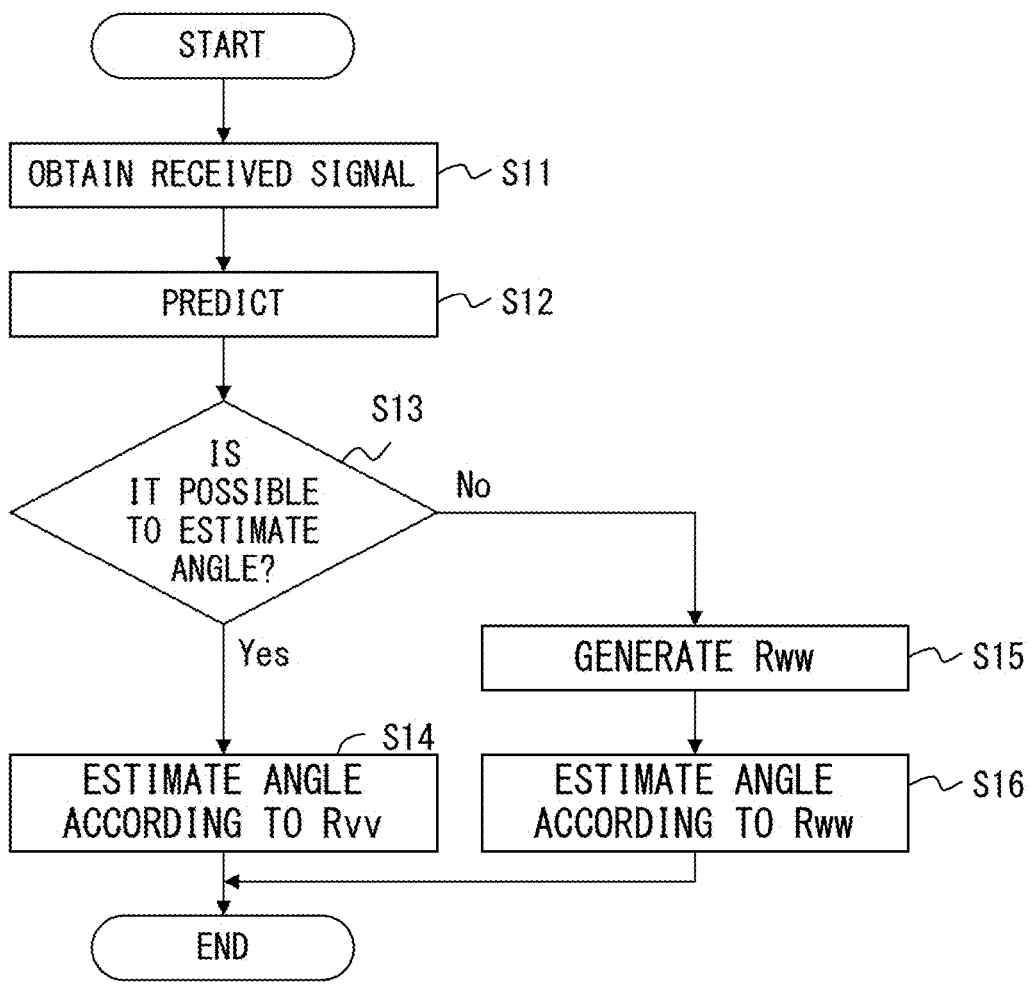
FIG. 7 is a flowchart illustrating an angle estimation method performed by a detection and ranging system that includes a predictor.

FIG. 7 is a flowchart illustrating an angle estimation method performed by a detection and ranging system that includes the predictor 33. This process may be repeatedly performed by the signal processor 30 at regular intervals in accordance with an operation cycle of the system (e.g., a cycle of a modulation input signal).

In S11, the signal processor 30 obtains L received signals $v_1$ to $v_L$ from an effective sensor array that is configured by synthesizing M transmitting sensor elements and N receiving sensor elements. Here, L=M×N. In S12 to S13, the predictor 33 predicts whether it is possible to estimate an angle according to a covariance matrix $R_{vv}$ generated from a received signal vector v by the matrix generator 31.

When the predictor 33 predicts that it is possible to estimate an angle, the estimator 32 estimates in S14 the direction of arrival of an echo signal according to the covariance matrix $R_{vv}$. In this case, the matrix generator 31 does not need to generate a pseudo covariance matrix $R_{ww}$.

Meanwhile, when the predictor 33 predicts that it is impossible to estimate an angle, the matrix generator 31 generates in S15 a pseudo covariance matrix $R_{ww}$ according to a received signal vector and a phase offset matrix. In S16, the estimator 32 estimates the direction of arrival of an echo signal according to the pseudo covariance matrix $R_{ww}$.

Figure 8:
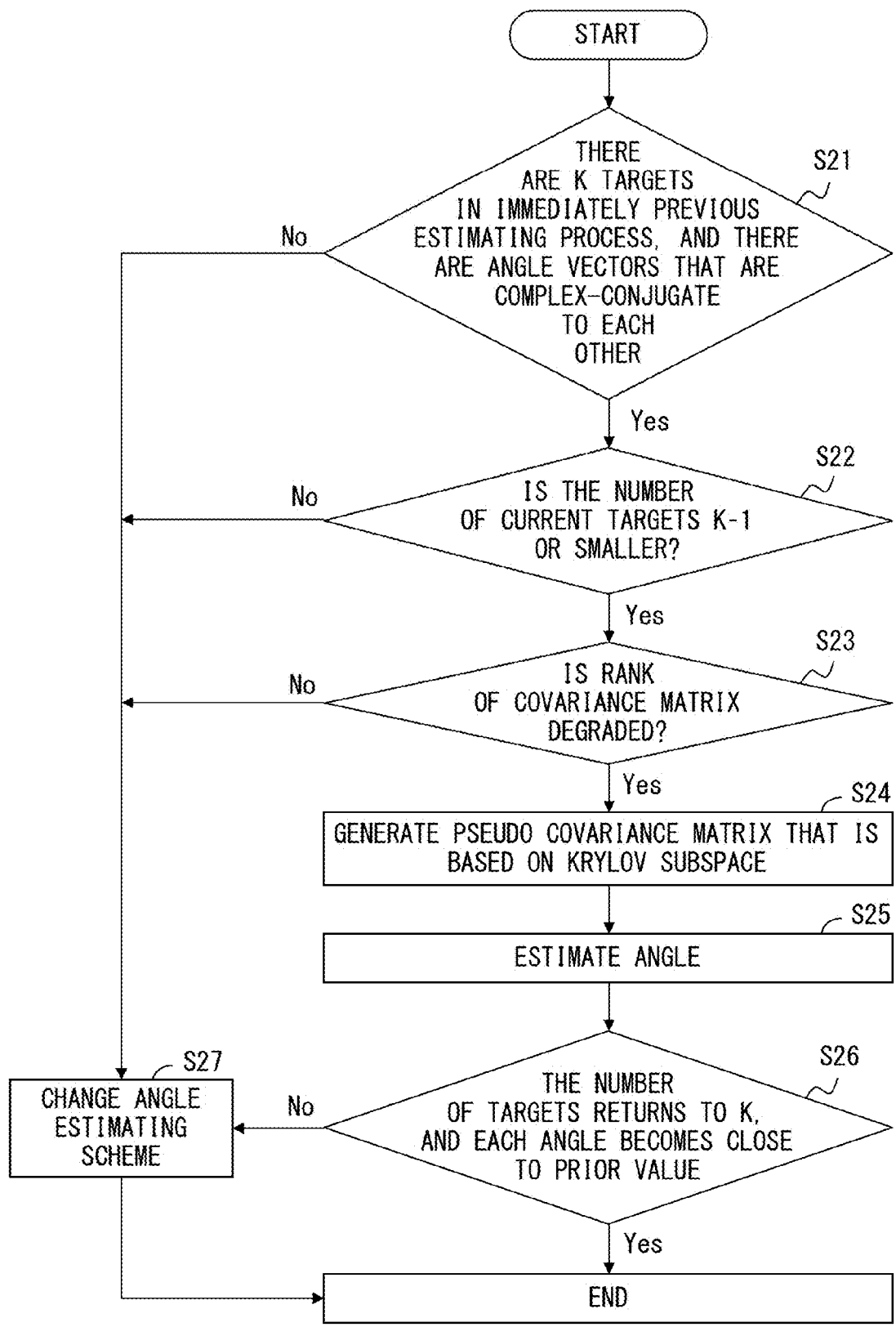
FIG. 8 is a flowchart of an angle estimating method in accordance with another embodiment.

FIG. 8 is a flowchart of an angle estimation method in accordance with another embodiment. The process of this flowchart is repeatedly performed by the signal processor 30 at regular intervals. That is, the signal processor 30 periodically estimates an angle formed with each target within a detection range. Results of estimation are stored in a memory (not illustrated) or in a memory installed in the signal processor 30.

In S21, the signal processor 30 determines whether there are K targets in immediately previous estimating process and whether there are angle vectors that are complex-conjugate to each other (see the general case in the "BACKGROUND" section of this description). A proper threshold is used in actual decision. For example, about 10-15 percent of the minimum angular resolution which is achievable in an assumed S/N environment by an apparatus that implements the estimation method according to the embodiments is a proper value. As an example, the threshold may be an error in the absolute values of two angles that is 0.2 degree or smaller.

When there are such angle vectors, the signal processor 30 determines in S22 whether the number of current targets is equal to or smaller than (K−1).

When the number of current targets is (K−1) or smaller, the signal processor 30 determines in S23 whether the rank of the covariance matrix $R_{vv}$ is degraded. When the rank of the covariance matrix $R_{vv}$ is degraded, the process of S24 is performed.

In S24, the signal processor 30 generates a pseudo covariance matrix $R_{ww}$ that is based on a Krylov subspace. Note that a pseudo covariance matrix that is based on a Krylov subspace is described with reference to formulae (2.1) to (2.4). This process is performed by the matrix generator 31.

In S25, the signal processor 30 estimates an angle formed with each target using the pseudo covariance matrix $R_{vv}$ generated in S24. As an example, this angle estimating is achieved by substituting the pseudo covariance matrix $R_{ww}$ in formula (1.9) and by detecting an angle with the $P_{Capon}$ that corresponds to a peak while scanning θ. Alternatively, eigenvalue decomposition may be applied to a matrix obtained as a result of application of some additional operations to the pseudo covariance matrix $R_{ww}$, and an angle formed with a target may be estimated using the eigenvalue. This process is performed by the estimator 32.

In S26, the signal processor 30 determines whether the number of targets returns to K and whether the angle formed with each target becomes close to a prior value. When "Yes" is obtained in S26, the signal processor 30 stores the result of estimation and ends the process. When "No" is obtained in any of S21, S22, S23 and S26, the signal processor 30 changes the angle estimating scheme in S27.

In the example illustrated in FIG. 8, when the number of detected targets decreases and the rank of a covariance matrix is degraded, an angle is estimated using a pseudo covariance matrix. As a result, even when targets are located at special positions as illustrated in FIG. 2, a situation in which it is impossible to estimate the angles formed with the targets is avoided. Accordingly, reliability and practicability of detection and ranging systems are enhanced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from Lhe spirit and scope of the invention.

What is claimed is:

1. A detection and ranging system comprising:
M transmitting sensor elements configured to transmit a probe signal;
N receiving sensor elements configured to receive an echo signal generated upon reflection of the probe signal from a target;
a matrix generator configured to generate a third matrix by multiplying a first matrix by a second matrix, the first matrix including as diagonal components L received signals obtained from an effective receiving sensor array formed by synthesizing the M transmitting sensor elements and the N receiving sensor elements, the second matrix being formed of P L-dimensional vectors that are linearly independent of each other, P being an integer that is smaller than L; and an estimator configured to estimate a direction of arrival of the echo signal from the target according to a pseudo covariance matrix generated by multiplying the third matrix by Hermitian conjugate transposition of the third matrix.

2. A detection and ranging system comprising:

M transmitting sensor elements configured to transmit a probe signal;

N receiving sensor elements configured to receive an echo signal generated upon refection of the probe signal from a target;

a matrix generator configured to generate an extended received signal matrix by arranging multiplication results obtained by multiplying a received signal vector representing the received signals by each matrix that is a (p−1)-th power of a phase offset matrix (p=1 to P; P is an integer that is smaller than L) in respective columns; and an estimator configured to estimate a direction of arrival of the echo signal from the target according to a pseudo covariance matrix generated by multiplying the extended received signal matrix by Hermitian conjugate transposition of the extended received signal matrix, wherein the phase offset matrix is a diagonal matrix that includes $\exp(j*\delta)$, $\exp(j*2\delta)$, ... $\exp(j*L\delta)$ as diagonal components, and j represents a complex number, and δ represents a specified real number other than zero.

3. A detection system comprising:

M transmitting sensor elements configured to transmit a probe signal;

N receiving sensor elements configured to receive an echo signal generated upon reflection of the probe signal from a target;

a matrix generator configured to generate a third matrix by multiplying a first matrix by a second matrix, the first matrix including as diagonal components L received signals obtained from an effective receiving sensor array formed by synthesizing the M transmitting sensor elements and the N receiving sensor elements, the second matrix being formed of P L-dimensional vectors that are linearly independent of each other, P being an integer that is smaller than L; and an estimator configured to estimate a direction of arrival of the echo signal from the target according to a fourth matrix obtained by subtracting a specified value from each diagonal component of a pseudo covariance matrix generated by multiplying the third matrix by Hermitian conjugate transposition of the third matrix, wherein the specified value is determined based on a sum of diagonal components of a matrix obtained by multiplying the second matrix by Hermitian conjugate transposition of the second matrix.

4. A detection and ranging system comprising:

M transmitting sensor elements configured to transmit a probe signal;

N receiving sensor elements configured to receive an echo signal generated upon reflection of the probe signal from a target;

a matrix generator configured to generate a third matrix by multiplying a first matrix by a second matrix, the first matrix including as diagonal components L received signals obtained from an effective receiving sensor array formed by synthesizing the M transmitting sensor elements and the N receiving sensor elements, the second matrix being formed of P L-dimensional vectors that are linearly independent of each other P being an integer that is smaller than L;

a first estimator configured to estimate a direction of arrival of the echo signal from the target according to a covariance matrix of received signal vectors representing the received signals;

a predictor configured to decide whether or not an estimation result obtained by the first estimator is appropriate; and a second estimator configured to estimate a direction of arrival of the echo signal from the target according to a pseudo covariance matrix generated by multiplying the third matrix by Hermitian conjugate transposition of the third matrix when the predictor decides that the estimation result obtained by the first estimator is not appropriate, wherein when a value of a determinant of the covariance matrix is close to zero or when a change in the estimation result obtained by the first estimator with respect to time is greater than a specified threshold, the predictor decides that the estimation result obtained by the first estimator is not appropriate.

5. An angle estimation method used by a detection and ranging system including M transmitting sensor elements that transmit a probe signal, N receiving sensor elements that receive an echo signal generated upon reflection of the probe signal from a target, and a processor, the angle estimation method comprising:

generating, executed by the processor, a third matrix by multiplying a first matrix by a second matrix, the first matrix including as diagonal components L received signals obtained from an effective receiving sensor array formed by synthesizing the M transmitting sensor elements and the N receiving sensor elements, the second matrix being formed of P L-dimensional vectors that are linearly independent of each other, P being an integer that is smaller than L; and estimating, executed by the processor, a direction of arrival of the echo signal received from the target according to a pseudo covariance matrix of the third matrix.

* * * * *